United States Patent

Plöckl

(10) Patent No.: US 12,409,520 B2
(45) Date of Patent: *Sep. 9, 2025

(54) MILLING ADAPTER FOR A WORK TABLE

(71) Applicant: MarMan Tools GmbH, Warngau (DE)

(72) Inventor: Manfred Plöckl, Holzkirchen (DE)

(73) Assignee: MarMan Tools GmbH, Warngau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,270

(22) Filed: Jan. 2, 2024

(65) Prior Publication Data

US 2024/0131646 A1 Apr. 25, 2024
US 2024/0227099 A9 Jul. 11, 2024

Related U.S. Application Data

(63) Continuation of application No. 16/980,703, filed as application No. PCT/EP2019/055849 on Mar. 8, 2019, now Pat. No. 11,938,578.

(30) Foreign Application Priority Data

Mar. 21, 2018 (DE) ..................... 10 2018 106 669.4

(51) Int. Cl.
B23C 1/20 (2006.01)
B23C 1/12 (2006.01)
(Continued)

(52) U.S. Cl.
CPC ................ *B23Q 1/032* (2013.01); *B23C 1/12* (2013.01); *B23C 9/00* (2013.01); *B23Q 1/625* (2013.01);
(Continued)

(58) Field of Classification Search
CPC .......... B27C 5/10; B27C 5/02; B23Q 9/0085; B23Q 1/50–1/525; B23Q 1/4852;
(Continued)

(56) References Cited

U.S. PATENT DOCUMENTS 1,532,683 A 4/1925 Carter
1,566,824 A 12/1925 Carter
(Continued)

FOREIGN PATENT DOCUMENTS

DE 3102555 A1 8/1982
DE 10 2007 011 784 A1 1/2008
(Continued)

OTHER PUBLICATIONS

Machine translation of a communication from the European Patent Office in application No. 19711271.7, dated Oct. 24, 2024.*
(Continued)

*Primary Examiner* — Erica E Cadugan
(74) *Attorney, Agent, or Firm* — Studebaker Brackett PLLC

(57) ABSTRACT

The invention relates to an interchangeable milling adapter (20) for a work table (60), which comprises a receptacle (21) for a milling machine (70) and an angular adjustment (22). At the same time, an angular position (WP1, WP2) of the receptacle (21) in relation to the work table can be adjusted using the angular adjustment (22). Furthermore, a work table, a milling unit and their use for adjusting a milling machine are described.

19 Claims, 5 Drawing Sheets

Figure 1:
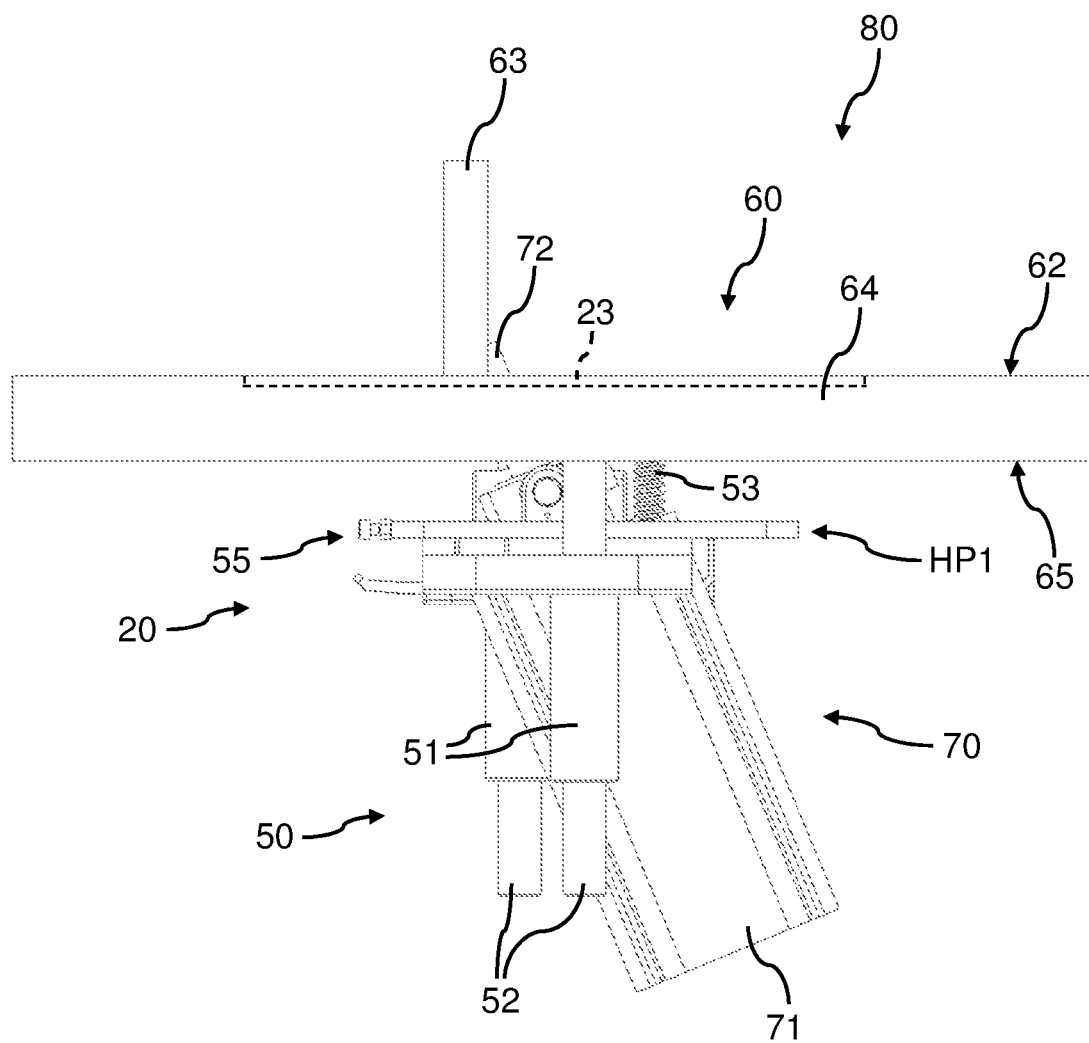

(51) Int. Cl.
*B23C 9/00* (2006.01)
*B23Q 1/03* (2006.01)
*B23Q 1/52* (2006.01)
*B23Q 1/62* (2006.01)
*B23Q 9/00* (2006.01)
*B25H 1/00* (2006.01)
*B25H 1/02* (2006.01)
*B25H 1/10* (2006.01)
*B27C 5/02* (2006.01)
*B27C 5/10* (2006.01)

(52) U.S. Cl.
CPC ......... *B23Q 9/0085* (2013.01); *B25H 1/0042* (2013.01); *B25H 1/02* (2013.01); *B27C 5/02* (2013.01); *B27C 5/10* (2013.01); *B23C 1/20* (2013.01); *B23Q 1/525* (2013.01); *B23Q 1/623* (2013.01); *Y10T 409/303752* (2015.01); *Y10T 409/306608* (2015.01); *Y10T 409/307672* (2015.01); *Y10T 409/308176* (2015.01)

(58) Field of Classification Search
CPC .......... B23Q 1/623; B23Q 1/625; B25H 1/04; B25H 1/02; B25H 1/0042; B25H 1/005; B23C 1/20; Y10T 409/307672; Y10T 409/308512; Y10T 409/308232; Y10T 409/306216–306608
USPC ........................ 409/175–182, 201, 211, 216; 451/344–359; 144/136.95, 154.5
See application file for complete search history.

(56) References Cited

U.S. PATENT DOCUMENTS

| | | |
|---|---|---|
| 1,736,965 A | 11/1929 | Carter |
| 2,630,151 A | 3/1953 | Turnbull |
| 2,702,569 A | 2/1955 | Yelle |
| 2,799,305 A | 7/1957 | Groehn |
| 3,534,639 A | 10/1970 | Treichler |
| 3,890,058 A | 6/1975 | Self et al. |
| 4,082,474 A | 4/1978 | Stiger |
| 4,290,464 A | 9/1981 | Marsan |
| 4,572,715 A | 2/1986 | Wolff |
| 4,591,305 A | 5/1986 | Bergler |
| 4,655,653 A | 4/1987 | Hall et al. |
| 4,729,698 A | 3/1988 | Haddon |
| 4,774,986 A | 10/1988 | LaGra |
| 4,977,938 A | 12/1990 | Greeson |
| 5,139,061 A | 8/1992 | Neilson |
| 5,139,065 A | 8/1992 | Stark |
| D351,774 S | 10/1994 | Witt |
| 5,398,740 A | 3/1995 | Miller |
| 5,667,001 A | 9/1997 | Sanger et al. |
| 5,772,368 A | 6/1998 | Posh |
| 6,016,854 A | 1/2000 | Ziegler |
| 6,027,289 A | 2/2000 | Posh |
| 6,138,372 A | 10/2000 | Newman |
| 6,305,447 B1 | 10/2001 | Rousseau |
| 6,374,878 B1 | 4/2002 | Mastley et al. |
| 6,505,659 B1 | 1/2003 | Hummel |
| 7,066,695 B1 | 6/2006 | Nuss |
| 7,131,898 B2 | 11/2006 | Adkins et al. |
| 7,363,950 B2 | 4/2008 | Wielechowski |
| 7,785,049 B2 | 8/2010 | Radermacher |
| 8,002,504 B1 | 8/2011 | Kochanowicz |
| 8,375,541 B1 | 2/2013 | Beachy et al. |
| 11,938,578 B2 * | 3/2024 | Plöckl ................ B23Q 1/522 |
| 2002/0020466 A1 | 2/2002 | McFarlin et al. |
| 2005/0081954 A1 | 4/2005 | Wielechowski |
| 2006/0086425 A1 | 4/2006 | Hyde |
| 2010/0132840 A1 | 6/2010 | Vidal Carres et al. |
| 2010/0239382 A1 | 9/2010 | Hummel |
| 2017/0066122 A1 | 3/2017 | Iannelli |
| 2017/0246758 A1 | 8/2017 | Wenning et al. |

FOREIGN PATENT DOCUMENTS

| | | |
|---|---|---|
| EP | 0 144 490 A2 | 6/1985 |
| EP | 0469344 A1 | 2/1992 |
| EP | 0 440 358 B1 | 3/1996 |
| EP | 1 136 206 A2 | 9/2001 |
| EP | 2 191 946 A2 | 6/2010 |
| GB | 2137137 A | 10/1984 |
| GB | 2196571 A | 5/1988 |
| GB | 2 375 075 A | 11/2002 |

OTHER PUBLICATIONS

International Search Report issued in PCT/EP2019/055849; mailed May 31, 2019.

Communication pursuant to Article 94(3) EPC issued by the European Patent Office on Oct. 24, 2024, which corresponds to European Patent Application No. 19711271.7-1103.

* cited by examiner

FIG. 8

Angular adjustment having at least one snap-in point in a predefined angular position

MILLING ADAPTER FOR A WORK TABLE

CROSS-REFERENCE TO RELATED APPLICATIONS

This application is a Continuation of U.S. patent application Ser. No. 16/980,703 filed Sep. 14, 2020, which is the U.S. National Stage of International Application No. PCT/EP2019/055849 filed Mar. 8, 2019, which claims benefit of priority to German Patent Application No. 10 2018 106 669.4 filed Mar. 21, 2018, the entire contents of which are incorporated herein by reference.

The invention relates to an interchangeable milling adapter for a work table, such a work table and a milling unit and the use thereof for setting a milling machine.

Milling machines are machine tools that remove material by machining from a workpiece by means of a rotating cutting tool. For milling machines, a distinction is made between stationary milling machines and hand milling machines. While stationary milling machines are almost exclusively available in professional manufacturing or handicraft companies, hand milling machines are also often used in smaller workshops by hobbyists. Only simple guide means, such as a rail for linear guidance, are common for hand milling machines. Stationary milling machines, on the other hand, offer a variety of setting options up to a fully automatic control for CNC milling or machining centers for the complete machining of a workpiece.

Also known from practice are table milling machines which have a swiveling milling spindle and are therefore also referred to as "swivel spindle milling machines". There is usually enough space available for these highly specialized machines in professional workshops. In the case of restricted conditions, such as those prevailing in do-it-yourself workshops, the setting option described above often has to be dispensed with, since it is not possible to purchase a stationary table milling machine for reasons of space.

It is therefore an object of the present invention to provide a space-saving alternative to the stationary swivel spindle milling machines.

This object is achieved by interchangeable milling adapters, a work table, a milling unit, and a use for setting a milling machine, according to the present invention.

The interchangeable milling adapter for a workbench mentioned above comprises, according to the invention, a receptacle for a milling machine and an angular adjustment. An angular position of the receptacle in relation to the work table can be adjusted here using the angular adjustment.

The milling adapter here designates a connection device between the work table and the milling machine. Accordingly, it has suitable means for the work table in order to establish a temporary, preferably positive and/or frictional connection to the work table. Here "Temporary" describes the connection time desired by a user.

Here "Interchangeable" or "exchangeable" means that the milling adapter can be exchanged as required, for example, with a different adapter for another machine tool. In contrast to the swivel spindle milling machines known from practice, the milling adapter is not an integral, internally arranged or hard-to-reach component of a stationary table milling machine, which is usually changed only for repair purposes. Rather, according to the invention, it is an easily accessible and comparatively simple—preferably with a few hand movements—removable holder for a milling machine from the work table. Accordingly, existing work tables can advantageously be retrofitted with a milling adapter according to the invention.

A holder for the milling machine is referred to as a "receptacle", in which the milling machine, in particular a hand milling machine, can be fastened in a positive and/or frictional manner. Basically, different milling machines can therefore be connected to the work table by means of a suitable receptacle using the milling adapter. The receptacle can be designed, for example, as a clamp, circumferential clamp or the like.

In the context of the invention, both a hand milling machine, such as a routing machine or a so-called trimmer, as well as a milling motor or a milling spindle can be arranged in the receptacle as a milling machine. These terms are therefore largely used synonymously in the following.

The receptacle is rotatably mounted relative to the work table by means of the angular adjustment. It can thus be pivoted or rotated about an axis of rotation of the angular adjustment and positioned at a desired angle to the work table, in particular to its work surface. This means that an angle or an angular position between the receptacle and the work table can be set by means of a pivot bearing of the angular adjustment, so that the milling machine and its tool can also be tilted to a corresponding angle and positioned at this angle during operation. The angular position can basically be chosen freely in the usual work area.

The work table mentioned above has a milling adapter according to the invention. A work table is understood to be any table or work bench suitable for machining workpieces. It is set up for use with the milling adapter according to the invention or can be converted accordingly. It therefore has, for example, means suitable for the milling adapter in order to establish a temporary, preferably positive and/or frictional connection with the milling to adapter. The work table also preferably comprises a table top having a work surface on the top that also serves as a guide for a workpiece. A table stop or milling stop is preferably arranged on the work surface as an additional guide for the workpiece.

The milling unit mentioned above comprises a work table according to the invention and a milling machine which is arranged in the receptacle. The milling machine can be a separate milling spindle, but depending on the receptacle used, a so-called "trimmer", that is, a one-handed hand milling machine, or a router that may have been modified for the receptacle, can be used.

The milling unit described above is used according to the invention for adjusting the milling machine. A desired angular position is set here by means of the angular adjustment, preferably in a first step. The milling machine can then optionally be positioned by means of a milling lift and a linear guide so that a desired region of a workpiece is removed during operation.

Typically, the workpiece should be machined at an edge at a certain angle for mold fitting, for example, to be joined later with other workpieces in this region. Accordingly, it is expedient to first set the angle and then to adjust the tool in the translation directions relative to the work table so that the desired region is removed during operation as the workpiece passes by.

The invention described above thus essentially offers—in particular also for a hand milling machine that is affordable for do-it-yourself enthusiasts—the same setting options as professional swivel spindle milling machines. In particular, equipment that is already present in the workshop can be used, which advantageously keeps the acquisition costs low. In addition to the work table that is usually present, the invention hardly requires any further storage space and is therefore also suitable for limited space.

Further particularly advantageous refinements and developments of the invention arise from the dependent claims and the following description, wherein the independent claims of one claim category can also be developed analogously to the dependent claims of another claim category and, in particular, individual features of different embodiments can also be combined to form new embodiments.

The milling adapter is preferably configured as a table insert for a table opening. When used as intended, a base plate of the milling adapter is particularly preferably arranged flush with a work surface of the work table. The table opening denotes a recess in or a breakthrough through the table top of the work table. The milling adapter can be used therein, so that during operation, only the tool of the milling machine protrudes upwards through the work surface and beyond it. The milling adapter is thus advantageously accessible directly from above as a table insert like the work surface. However, it does not interfere with the use of the work surface, since all of its components are arranged planar with or under the work surface.

The angular adjustment preferably has a swivel axis which, during operation, is arranged underneath a table top of the work table. Here, "Underneath" means that the swivel axis is arranged on a side of one of the table tops, which is opposite the top work surface on which a workpiece is machined during operation.

In the swivel spindle milling machines known from practice, complicated mechanisms are usually used in order to keep the swivel axis as level as possible on the work surface and to make the setting as comfortable as possible. However, the departure from this concept according to the invention makes it possible to make the swivel mechanism advantageously simple and inexpensive, as is explained in more detail below.

The milling adapter preferably comprises a base plate in which an elongated hole is arranged. The tool protrudes through the elongated hole a bit beyond the work surface during operation in order to come into contact with the workpiece and to remove the desired region of the workpiece.

In a pivoted angular position of the tool, a longer region extending perpendicular to the axis of rotation of the angular adjustment is generally occupied by the tool in the plane of the work surface than in an angular position in which the tool is arranged perpendicular to the work surface of the work table. In this region, the elongated hole extends with its longitudinal direction, that is, in the direction of its greater extent. In this way, the workpiece has a supporting surface on the side of the elongated hole, which in operation comes up to the tool, so that unwanted machining and possible accident hazards due to too much play on the workpiece can be advantageously avoided as much as possible.

The milling adapter preferably has a milling lift for height adjustment. The milling lift comprises, for example, a lift platform, a lift guide and/or a lift drive. The lift guide can be configured, for example, as a linear guide and in particular as a cylinder guide. It connects the lift platform to the base plate of the milling adapter such that the lift platform can only be moved in one direction perpendicular to the work surface of the work table. For example, the angular adjustment and/or the receptacle for the milling machine are arranged, among other things, on the lift platform. The lift drive can be configured, for example, as a lifting spindle, which is freely rotatably mounted in the base plate of the milling adapter and engages in a corresponding thread arranged on the lift platform. When the lifting spindle rotates, the lift platform is moved, for example, towards or away from the base plate of the milling adapter, depending on the direction of rotation.

The milling lift can be particularly preferably operated from the table's upper side. An adjusting screw, for example, can be arranged in the base plate of the milling adapter to operate the milling lift, which can be actuated by means of an Allen key, Torx® key or the like. For example, the screw is connected to the lifting spindle of the milling lift, which is rotated when the screw is actuated.

The angular adjustment preferably has an angular locking. The angular locking is a blocking element with which the angular adjustment is held in the desired, previously set position. This can be achieved, for example, by the blocking element, in defined angular positions, for example, in 1° or 5° steps or at the snap-in points described later, interacting in a positive manner with a rotatable element of the receptacle and preventing a further rotational movement via positive locking.

The angular locking particularly preferably comprises at least one eccentric clamp, which acts in a frictional manner on a rotatable element of the receptacle. That is, the applied contact pressure prevents a further rotational movement of the angular adjustment. As a result, any angular positions can advantageously be continuously set.

The angular adjustment preferably has at least one snap-in point in a predefined angular position. The snap-in points are particularly preferably "soft" snap-in points. That is, the snap-in points preferably do not specify a mandatory position, but merely help, as much as possible, to simply find and exactly set the frequently used, predefined angular positions. This can be realized, for example, by a rotatable element of the angular adjustment having a snap-in hole at each of the defined angular positions, into which a prestressed pressure pin engages with a ball point. For this purpose, the pressure pin can be prestressed, for example, by means of a spring.

The ball point prevents a "hard" snap-in, so that every angular position can still be set around the snap-in points. The predefined angular positions are particularly preferably arranged at a 15°, 22.5°, 30° and/or 45° angle.

The angular adjustment preferably comprises an angle display. The angle display can be designed, for example, as a digital angle display. Alternatively or additionally, it can be configured as a simple scale of 5° steps between a rotatable element and a pivot bearing of the angular adjustment. The reading accuracy can be increased to 1° with the help of a vernier, for example, a scale having 5° graduation on the rotatable element and a scale having 4° graduation on the pivot bearing.

As already described above, the swivel axis of the milling adapter preferably does not lie in the region of the plane of the work surface of the work table. In order to be able to nevertheless position the milling machine as desired in the region of the work surface relative to the workpiece to be machined, the milling adapter according to the invention preferably comprises a slide and a linear guide. The slide on which the angular adjustment and the receptacle are arranged can be positioned in a linear direction using the linear guide. The linear direction extends parallel to a work surface of the work table and perpendicular to the swivel axis of the angular adjustment. As already explained above, the work surface corresponds to an upper side of the work table. The linear guide can basically be configured in the form of roller and/or slide bearings, as is explained in more detail later. The angular adjustment and the receptacle can thus also be positioned in the linear direction using the movable slide, as a result of which the milling machine can also be positioned in this direction.

The linear guide preferably has a linear locking. As already explained on the basis of the angular locking, the linear locking is also a blocking element with which the slide is held in a desired previously set position of the linear guide. The linear locking preferably comprises at least one eccentric clamp, which generates a frictional connection between the slide and the linear guide. That is, the pressure applied prevents a further movement of the slide. The slide can thus be continuously locked in any position of the linear guide.

The linear guide preferably comprises a support rail and a guide rail. The support rail and the guide rail are arranged parallel and in a plane parallel to the work surface of the work table, that is, in the linear direction. The slide is therefore preferably movably mounted in these two rails. This two-point mounting enables an essentially play-free positioning when locking. For this purpose, for example, the slide, for each rail, has a foot matching the rail, which slide in the respective rail and can optionally be blocked by means of the linear locking in the desired position.

While the support rail only serves as a counter bearing, the guide rail particularly preferably increases the accuracy of the positioning when locked through a positive frictional connection with the associated foot of the slide. For this purpose, the guide rail particularly preferably has a guide groove, for example, a V-groove or the like. The guide groove automatically guides the corresponding foot of the slide into an exact end position during the locking process.

Angle adjustment and/or the linear guide preferably comprise an adjustment screw. In the angular adjustment, the adjustment screw is arranged, for example, on a rotatable element and has, for example, a stop on the linear guide. This allows the free range of rotation of the angular adjustment to be restricted. A home position or a zero-position of the angular adjustment can be set or fixed by the position of the adjustment screw. This zero-position is, for example, located in an angular range from −5° to +50° in relation to a customary zero-position, for example, a position in which the tool is arranged perpendicular to the work surface.

Similarly, the adjustment screw of the linear guide limits the free travel range of the linear guide. For example, it can be arranged on the linear guide in such a way that it forms a stop for the slide. A home position or a zero-position can thus be set or fixed for the slide in the linear guide through position of the adjustment screw. This zero-position is, for example, in a range from −10 mm to +10 mm in relation to a usual zero-position of the slide in the linear guide.

The work table preferably has a table top in which the milling adapter, in particular a part of the milling adapter attached to the work table, is arranged in a positive manner. The positive locking takes place here in particular by means of the base plate of the milling adapter, which is preferably inserted into the table top and connects flush to the work surface of the table top of the work table. This creates a planar or flat surface for machining a workpiece. For this purpose, the table top preferably has a region which is lowered as a step and which matches the base plate of the milling adapter, all around the table opening.

Even if the milling adapter is already essentially held in its position by this positive locking or by gravity, it can also be secured with further fastening means such as screws, clamps or the like. This is particularly advantageous when vibrations occur during operation.

Figure 2:
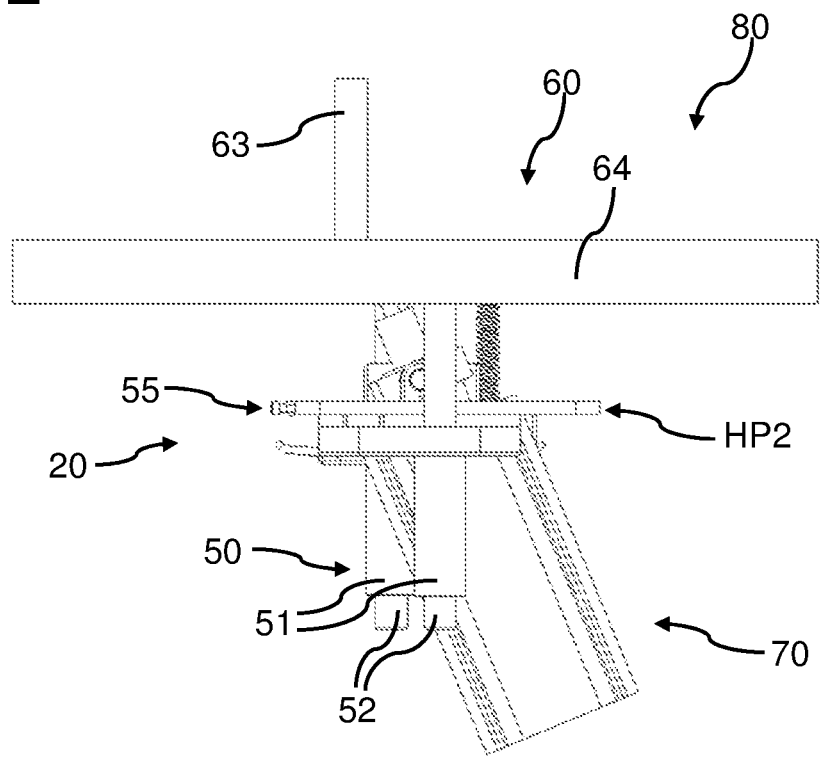
Figure 3:
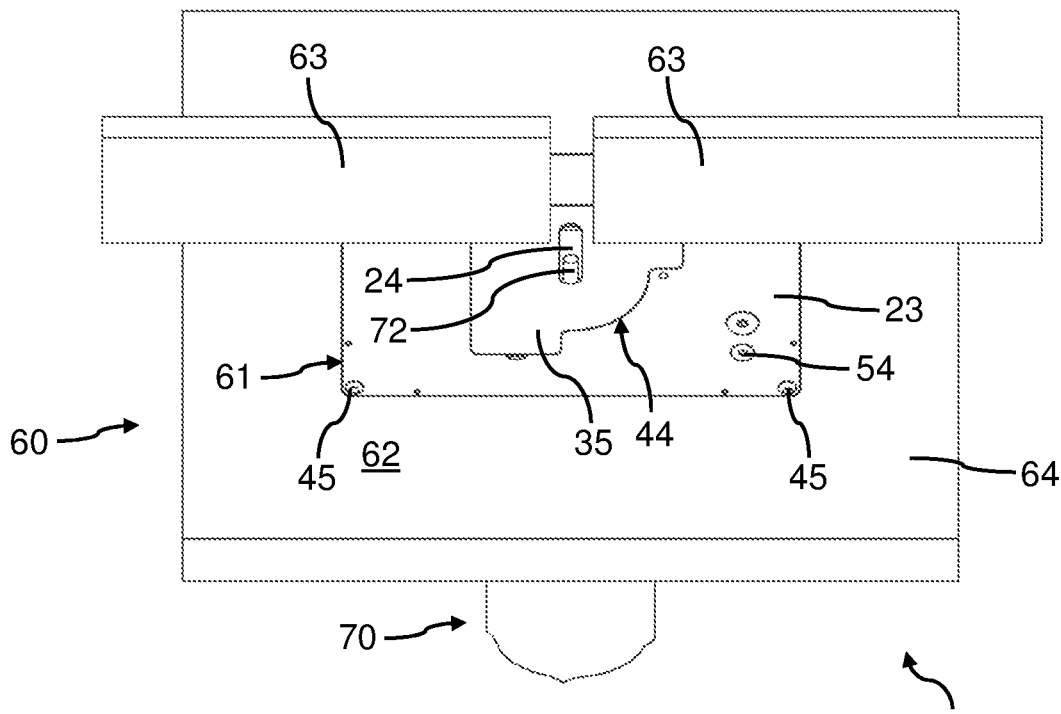
Figure 4:
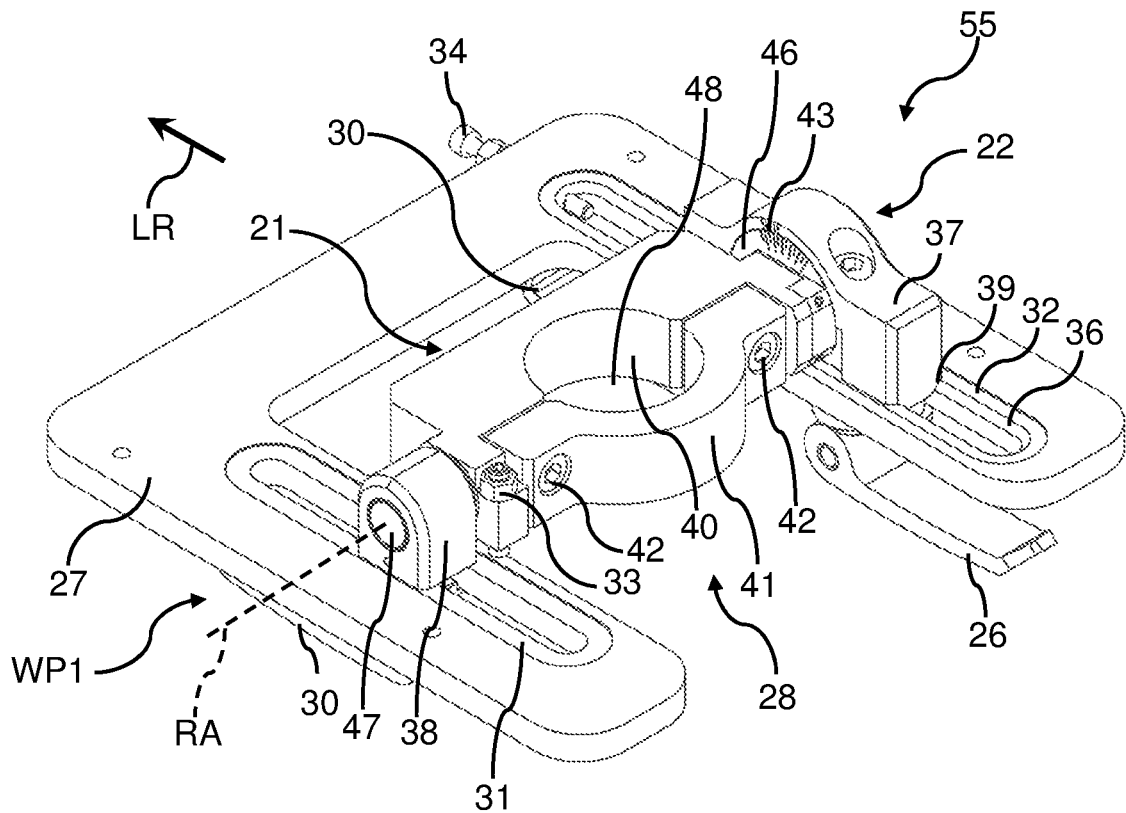
Figure 5:
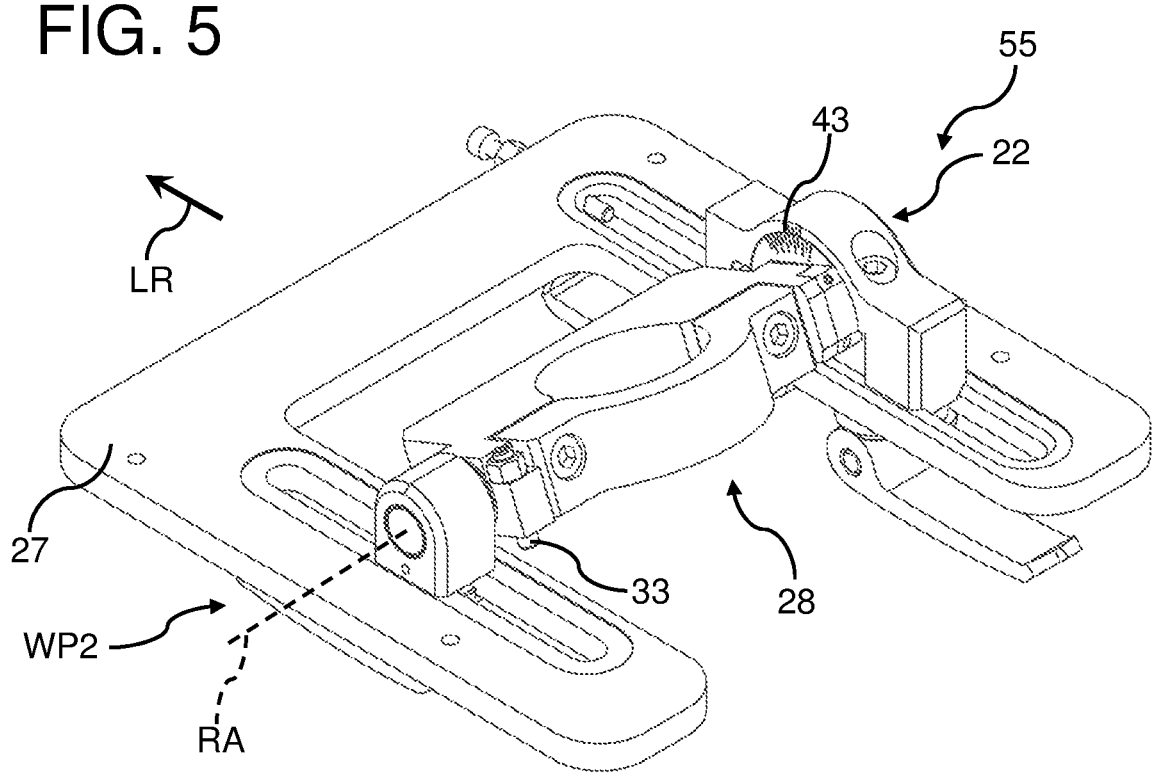
Figure 6:
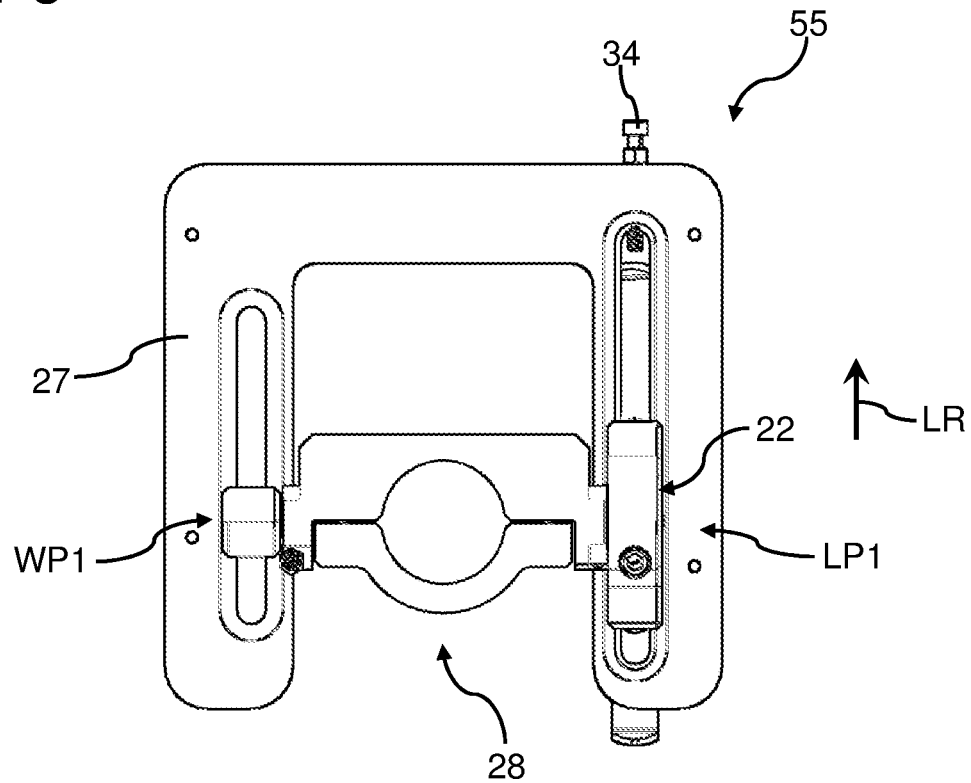
Figure 7:
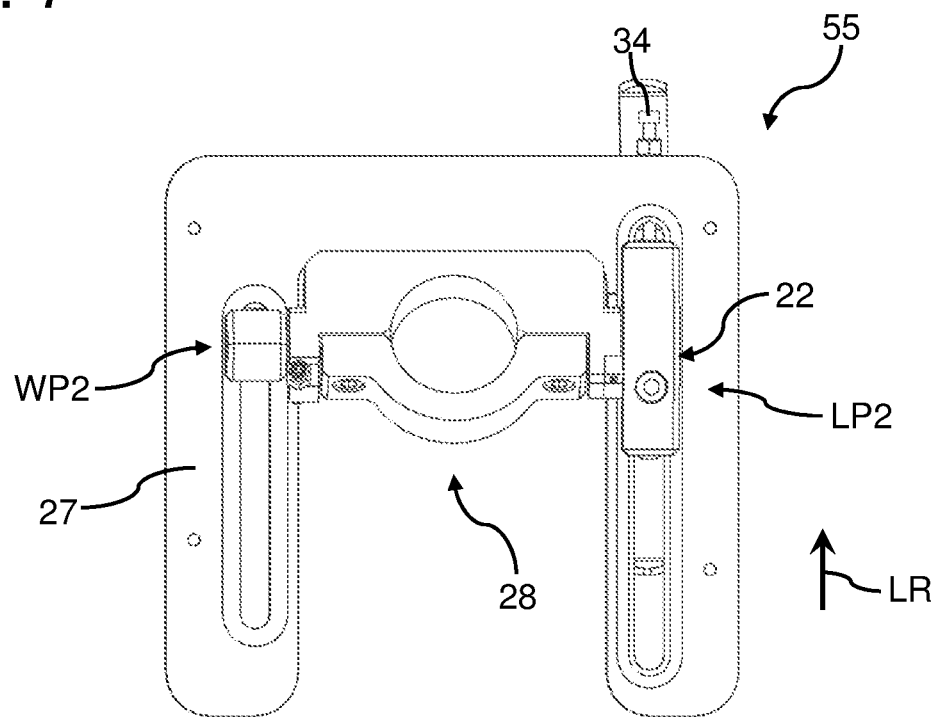

The invention is explained in more detail in the following with reference to the accompanying figures based on exemplary embodiments. Identical components are provided with identical reference numbers in the various figures. The figures are generally not to scale. Here relative directional specifications such as "below", "above", "underside" or "top side" refer to a work table set up as intended with a milling adapter according to the invention. Shown are:

FIG. 1 a roughly schematic side view of an embodiment of a milling unit according to the invention in a first height position, FIG. 2 a roughly schematic side view of the embodiment of FIG. 1 in a second height position, FIG. 3 a perspective view from above of the embodiment of FIG. 1, FIG. 4 a perspective view of an embodiment of a lift platform in a first angular position, FIG. 5 a perspective view of the embodiment of FIG. 4 in a second angular position, FIG. 6 a plan view of the embodiment of FIG. 4 in a first angular position and in a first linear position, FIG. 7 a plan view of the embodiment of FIG. 4 in a second angular position and in a second linear position, and FIG. 8 a schematic view of a further feature.

In FIG. 1, a milling unit 80 according to the invention is shown as an example in a side view. The milling unit 80 comprises a work table 60, a milling adapter 20 and a milling machine 70. The work table 60 has a flat table top 64 having a rectangular base, which, as is usual in a conventional table, is arranged horizontally during operation, that is, parallel to a ground. In addition to the elements shown here, the work table 60 preferably also comprises legs or supports in order to ensure a secure standing. The table top has an underside 65 and an opposite upper side 62, which simultaneously forms a work surface 62 for the work table 60. The work table 60 further comprises a table stop 63, which is also referred to as a milling stop. The table stop 63 comprises two guide plates arranged perpendicular to the work surface 62 (see FIG. 3). During operation, a workpiece (not shown here) resting on the work surface 62 is guided along the table stop 63 for machining.

The milling adapter 20 is fastened in the table top 64 by means of a flat base plate 23 (indicated dashed), which is explained in more detail with reference to FIG. 3. It comprises a milling lift 50 and a lift platform 55, which is explained in more detail with reference to FIGS. 4 to 7. It extends essentially below the work surface 62. The milling lift 50 comprises a lift guide 51, 52 which comprises two parallel inner cylinders 52 arranged vertically below the base plate 23 and two hollow cylinders 51 arranged on the inner cylinders 52. The inner cylinder 52 are firmly connected to the base plate 23, for example, welded. The hollow cylinder 51 and the inner cylinder 52 can be displaced relative to one another and form a slide bearing or a roller bearing. The lift platform 55 is firmly connected to the hollow cylinders 51, for example, welded, the lift platform being arranged essentially parallel to the work surface 62 of the work table 60.

The milling lift 50 further comprises a lift drive 53, 54. The lift drive 53, 54 has a lifting spindle 53 which is rotatably mounted on the base plate 23, wherein the lifting spindle 53 is not movable relative to the base plate 23 in the translational degrees of freedom. The lifting spindle 53 has an external thread and extends perpendicular to the base plate 23 or parallel to the lift guide 51, 52. An internal thread (not shown here) matching the lifting spindle 53 is arranged on the lift platform 55 and is firmly connected to the latter. The lifting spindle 53 engages in the internal thread. A distance between the lift platform 55 and the base plate 23 or the work surface 62 of the work table 60 can thus be set using a rotation of the lifting spindle 53. The milling lift 50 thus serves as a height adjustment of the milling adapter 20.

The milling machine 70 is connected to the work table 60 via the milling adapter 20. The milling machine comprises a milling spindle 71 (or a milling motor) and a milling tool 72 (also referred to briefly as "tool" in the following). The milling spindle 71 is connected to the tool 72 by means of a tool receptacle (not shown here).

A first height position HP1 was set by means of the milling lift 50 as a height adjustment, in which the tool 72 protrudes beyond the work surface 62 of the work table 60. When the milling machine 70 is put into operation, the tool 72 rotates and removes material from a workpiece which is guided along the table stop 63.

FIG. 2 shows the milling unit 80 of FIG. 1 in the same view, wherein, however, here the lift platform 55 is in a second height position HP2. The lift platform 55 was moved downward by means of actuating the lifting spindle 53. The distance between the lift platform 55 and the table top 64 is greater here and the tool 72 of the milling machine 70 no longer protrudes beyond the worktop 62.

In FIG. 3, the milling unit 80 of FIG. 1 is shown schematically by way of example and in a perspective top view. A table opening 61 is arranged under the base plate 23 introduced into the table top 64, through which the milling adapter 20, with the milling machine 70, projects downward. Here the base plate 23 is arranged in a recess (not shown here) in the table top 64 that is lowered as a step and matches it. The essentially rectangular base plate 23 is fitted into the table top 64 in a positive manner within a plane of the work surface 62.

The base plate 23 has a base plate opening 44. Above this, an insertion plate 35 is arranged in the base plate 23 in a recess (not shown here) which is lowered as a step and matches it. The shape of the insertion plate 35 can, in principle, be chosen as long as there is sufficient positive locking. For example, the insertion plate 35 can have a shape similar to that of a quarter circle protractor, as shown here. The insertion plate 35 is preferably ferromagnetic, so that it adheres to the base plate 23 which is provided with magnetic clamps. A pill-shaped elongated hole 24 is arranged in the insertion plate 35 and extends in the longitudinal direction, that is, in the direction of its greatest extent, in the plane of the work surface 62 and in the plane of rotation of the milling machine 70. During operation, the tool 72 of the milling machine 70 can protrude through the elongated hole 24 beyond the work surface 62 for machining a workpiece.

Although the base plate 23 is basically already held in its position by the positive locking with the table top 64 and the force of gravity, it can additionally be connected to the table top 64 with fastening screws 45 or other suitable fastening means. An adjusting screw 54 is also arranged in the base plate 23. The lifting spindle 53 of the milling lift 50 can be actuated with the aid of an Allen key by means of rotating the adjusting screw 54 and the height position of the lift platform 55 can thus be varied or adjusted.

FIGS. 4 to 7 show different views or settings of the lift platform 55. That is, the connecting means of the lift platform 55 to the lift guide 51, 52 and to the lift drive in the form of the lifting spindle 53 has been omitted on a representation of the holder.

The lift platform 55 comprises a linear guide 27 and a slide 28 guided therein (see FIG. 4). The linear guide 27 has an essentially U-shaped base. Here a support rail 31 is arranged in one of the two parallel U-legs and a guide rail 32 in the other. Both rails 31, 32 are essentially designed as elongated holes and extend parallel in the direction of the U-legs. This direction is referred to in the following as the linear direction LR.

The slide 28 comprises two slide feet 37, 38, a receptacle 21 and an angular adjustment 22. A pivot bearing 46, 47 is arranged in each slide foot 37, 38. In the two coaxial pivot bearings 46, 47, the receptacle 21 for the milling machine 70 is mounted as a rotatable element having an axis of rotation RA. The pivot bearings 46, 47 thus together form the angular adjustment 22 for the receptacle 21.

The slide foot 38 guided in the support rail 31 has a planar, flat base which fits to a region of the bearing rail 31 which is lowered in a step-like manner relative to the surrounding surface and which runs around the elongated hole of the support rail 31. The guide rail 32 is initially configured similarly to the support rail 31, but has a further depression as a guide groove in the form of a V-groove 36 toward its center, that is, towards the elongated hole. The slide foot 37 corresponding thereto has a base in which a V-section 39 is formed. This acts as a corresponding spring, thus forming the complement to the V-groove 36 and engaging in it.

The slide 28 can be locked by means of two eccentric clamps 30, each of which is associated with one of the slide feet 37, 38. In order to fix the slide 28, the eccentric clamp 30, which is associated with the guide rail 32, is preferably first actuated. The slide 28 is automatically self-centered due to the V-groove 36. The eccentric clamp 30, which is associated with the support rail 31, is then actuated. As a result, the slide foot 38 of the support rail 31 acts as a counter bearing to the slide foot 37 of the guide rail 32 and thus ensures additional stability of the slide 28. The eccentric clamps 30 here are arranged below the linear guide 27 and are each connected to a slide foot 37, 38 by means of a bolt (not shown here) through the elongated hole of the respective rail 31, 32. When the eccentric clamps 30 are tightened, the respective slide foot 37, 38 is thus pressed against its rail 31, 32. This creates a frictional connection that prevents the movement of the slide 28.

The angular adjustment 22 can also be locked by means of an eccentric clamp 26. When it is tightened, it acts in a frictional manner on the rotatable element, that is, the region of the receptacle 21 which is mounted in the pivot bearing 46, as a result of which a rotational movement is prevented.

The receptacle 21 is configured in the manner of a pipe clamp or circumferential clamp and comprises a holding element 40 and a clamping element 41. The holding element 40 has pins at the ends in both directions of the axis of rotation RA, the pins being rotatably mounted in the pivot bearings 46, 47 of the slide feet 37, 38. A semicircular recess is formed in its center, the recess together with a corresponding semicircular recess of the clamping element 41 forming a circular recess 48. A milling machine 70, that is, the milling spindle or the milling motor, is clamped in this recess during operation. For this purpose, the holding element 40 and the clamping element 41 are connected to one another by means of clamping screws 42 such that the milling machine 70 is held in the recess 48 in a frictional manner.

The linear guide 27 has an adjustment screw 34 which projects into the elongated hole of the guide rail 32. A stop position in the linear direction LR can be set for the slide foot 37 and thus for the slide 28 as a whole by turning the adjustment screw 34. This is explained in more detail with reference to FIGS. 6 and 7.

The angular adjustment 22 has an adjustment screw 33. It is arranged on the holding element 40 of the receptacle 21 and is consequently rotated with the receptacle. It has a stop on the upper side of the linear guide 27. Turning the adjustment screw 33 can set how far the receptacle 21 can be rotated in the angular adjustment 22 until the stop position is reached. FIG. 4 shows the angular adjustment 42 in a first angular position WP1, namely the stop position or the zero-position. A further rotation in the direction of the stop is no longer possible. In contrast, FIG. 5 shows the lift platform of FIG. 4 in a second angular position WP2, in which a rotation in both directions is possible.

The angular adjustment 22 also has an angle display 43 which displays the set angle in the manner of a vernier with the aid of two scales. The vernier is configured by attaching a scale having 5° graduation on the rotatable element and a scale having 4° graduation on the pivot bearing. This results in an overall reading accuracy in the range of 1°.

FIGS. 6 and 7 show the lift platform of FIG. 4 in different positions of the slide 28 in the linear guide 27. FIG. 6 shows the slide 28 in a first linear position LP1, in which it can be moved in and against the linear direction LR. Here the angular adjustment 22 is located in the first angular position WP1. FIG. 7 shows the slide 28 in a second linear position LP2, which is located in the stop with the adjustment screw 34 and therefore can no longer be moved in the linear direction LR. This is the stop position or zero-position of the slide 28 in the linear direction LR. Here the angular adjustment 22 is located in the second angular position WP2.

Overall, the position of the tool 72 can thus be set in one rotational degree by means of the angular adjustment 22 and in two translational degrees of freedom by means of the height adjustment 50 and the linear guide 27. The invention thus offers the setting options of a professional swivel spindle milling machine. However, it is less expensive and has a significantly smaller space requirement.

Finally, it is pointed out once again that the device described in detail above is merely an exemplary embodiment which can be modified in various ways by a person skilled in the art without departing from the scope of the invention. For example, different shapes of the base plate or the insertion plate are also included and the receptacle for the milling machine can also be adapted accordingly to the milling machine. Furthermore, the use of the indefinite articles "a" or "an" does not exclude the relevant characteristics also being able to be present several times. Likewise, the terms "element" and "unit" do not exclude that the component in question consists of several interacting subcomponents, which may also be spatially distributed.

LIST OF REFERENCE NUMBERS 20 milling adapter
21 receptacle
22 angular adjustment
23 base plate
24 elongated hole
27 linear guide
26, 30 eccentric clamp
28 slide
31 support rail
32 guide rail
33, 34 adjustment screw
35 insertion plate
36 V-groove
37, 38 slide foot
39 V-section
40 holding element
41 clamping element
42 clamping screw
43 angle display
44 base plate opening
45 fastening screws
46, 47 pivot bearing
48 recess
50 milling lift
51 hollow cylinder
52 inner cylinder
53 lifting spindle
54 adjusting screw
55 lift platform
60 work table
61 table opening
62 upper side, work surface
63 table stop, milling stop
64 table top
65 underside
70 milling machine
71 milling spindle
72 milling tool
80 milling unit
HP1 first height position
HP2 second height position
LP1 first linear position
LP2 second linear position
LR linear direction
RA axis of rotation
WP1 first angular position
WP2 second angular position

The invention claimed is:

1. An interchangeable milling adapter for a work table, the interchangeable milling adapter comprising:
   a receptacle for a milling machine,
   an angular adjustment,
   a milling lift for height adjustment, the milling lift having a lift platform,
   a slide, and
   a linear guide with which the slide can be positioned in a linear direction, the linear direction extending parallel to a work surface of the work table and perpendicular to a swivel axis of the angular adjustment, wherein
   an angular position of the receptacle can be adjusted in relation to the work table using the angular adjustment,
   the receptacle and the angular adjustment are arranged on the slide, and
   the angular adjustment is arranged on the lift platform.

2. The interchangeable milling adapter according to claim 1, which is configured as a table insert for a table opening.

3. The interchangeable milling adapter according to claim 1, wherein
   the swivel axis of the angular adjustment is arranged underneath a table top of the work table during machining operation of a milling machine.

4. The interchangeable milling adapter according to claim 1, comprising a base plate in which an elongated hole is arranged.

5. The interchangeable milling adapter according to claim 1, wherein the milling lift is configured to be operated from an upper side of the work table.

6. The interchangeable milling adapter according to claim 1, wherein the angular adjustment has at least one snap-in point in a predefined angular position.

7. The interchangeable milling adapter according to claim 1, wherein the angular adjustment has an angular locking.

8. The interchangeable milling adapter according to claim 7, wherein the angular locking comprises at least one eccentric clamp.

9. The interchangeable milling adapter according to claim 1, wherein the linear guide has a linear locking.

10. The interchangeable milling adapter according to claim 9, wherein the linear locking comprises at least one eccentric clamp.

11. The interchangeable milling adapter according to claim 1, wherein the linear guide comprises a support rail and a guide rail.

12. The interchangeable milling adapter according to claim 11, wherein the guide rail has a guide groove.

13. The interchangeable milling adapter according to claim 1, wherein the angular adjustment and/or the linear guide comprise an adjustment screw.

14. A work table having the interchangeable milling adapter according to claim 1.

15. The work table according to claim 14 having a table top in which the interchangeable milling adapter is arranged in a positive manner.

16. A milling unit having the work table according to claim 14 and a milling machine which is arranged in the receptacle.

17. The milling unit according to claim 16, configured to adjust the milling machine, wherein a desired angular position is set by means of the angular adjustment, and the milling machine is positioned by means of the milling lift and the linear guide so that a desired region of a workpiece is removed during machining operation of the milling machine.

18. The interchangeable milling adapter according to claim 1, wherein
the milling lift is configured to adjust a distance between the lift platform and the work surface.

19. The interchangeable milling adapter according to claim 18, further comprising:
a base plate, wherein
the interchangeable milling adapter is configured to be fastened in a table top of the work table by the base plate, and
the milling lift is configured to adjust a distance between the lift platform and the base plate.

* * * * *